United States Patent [19]
Shin

[11] Patent Number: 6,075,990
[45] Date of Patent: Jun. 13, 2000

[54] HANDOFF CONTROL METHOD AND COMMUNICATION SYSTEM IN A MULTIPLE FREQUENCY ENVIRONMENT

[75] Inventor: Yeong-Jong Shin, Kyungki-Do, Rep. of Korea

[73] Assignee: LG Information & Communications, Ltd., Seoul, Rep. of Korea

[21] Appl. No.: 09/019,587

[22] Filed: Feb. 6, 1998

[30] Foreign Application Priority Data

May 21, 1997 [KR] Rep. of Korea ................ 97 19869

[51] Int. Cl.[7] ........................................ H04Q 7/22
[52] U.S. Cl. .................... 455/440; 455/439; 455/442; 455/443; 455/450; 455/525
[58] Field of Search ................... 455/436, 437, 455/438, 439, 440, 441, 442, 443, 444, 450, 451, 452, 456, 447, 525

[56] References Cited

U.S. PATENT DOCUMENTS

| | | | |
|---|---|---|---|
| 5,101,501 | 3/1992 | Gilhousen et al. | 455/33 |
| 5,267,261 | 11/1993 | Blakeney, II et al. | 455/437 X |
| 5,790,528 | 8/1998 | Muszynski | 455/442 X |
| 5,917,811 | 6/1999 | Weaver, Jr. et al. | 455/437 X |
| 5,937,019 | 8/1999 | Padovani | 455/438 X |

*Primary Examiner*—Fan Tsang
*Assistant Examiner*—Philip J. Sobutka
*Attorney, Agent, or Firm*—Fleshner & Kim, LLP

[57] ABSTRACT

A handoff control method and communication system is provided that uses a virtual cell boundary in a multiple frequency environment. The handoff control method includes forming a virtual cell boundary using a frequency coexisting between a terminal base station on a boundary area of multiple frequency environment and an adjacent base station. Pre-determining a likelihood of handoff possibilities is then based on distance or round trip delay between the virtual cell boundary when establishing calls in the terminal base station to thereby assign different frequencies to the calls. When a call assigned as a frequency group having small handoff possibilities transitions to an object base station, a handoff time point is determined as the call approaches the virtual cell during movement to the object base station to control a hard handoff processing procedure between frequencies. Thus, the frequencies are assigned using information already in CDMA protocol messaging to accurately determine which and when established calls are to be handed-off to adjacent base stations. Accordingly, the percentage of successful handoffs is improved.

26 Claims, 4 Drawing Sheets

HANDOFF CONTROL METHOD AND COMMUNICATION SYSTEM IN A MULTIPLE FREQUENCY ENVIRONMENT

BACKGROUND OF THE INVENTION

1. Field of the Invention

The present invention relates to a code division multiple access (CDMA) communication system, and in particular, to a handoff control method for a CDMA mobile communication system.

2. Background of the Related Art

Generally, handoff serves to continually maintain a call between a mobile station and a base station when the mobile station moves from a current base station area to an adjacent base station area during the call. The handoff in a code division multiple access (CDMA) mobile communication system can be classified into a softer handoff, a soft handoff and a hard handoff.

The softer handoff is generated during movement between sectors of a base station. The sectors within the base station have the same frequencies and the same frame offset values. For the softer handoff process, a new speech path for an object sector are set while in a current sector an existing speech path between the mobile station and the base station is maintained. Thus, a voice packet is transmitted to a plurality of speech paths during the softer handoff. After the mobile station completely moves to the object sector, if the maintenance of the existing speech path is not required, the resource (e.g., the existing speech path) is retrieved.

The soft handoff is generated during movement between adjacent base stations (i.e., base station cells) where the same frequencies and the same frame offset values are used within each of the base stations. For a soft handoff process, a new speech path for an object base station cell is set while an existing speech path between a mobile station and the current base station is maintained for a predetermined time. Thus, a voice packet is transmitted to a plurality of speech paths. After completely moving to the object base station cell, if the maintenance of the existing speech path is not required, the resource (e.g., existing speech path) is retrieved.

The hard handoff is generated in the case where a frame offset value or a frequency is altered during movement between adjacent base stations and when a CDMA mobile communication system is moved to an analog system. For a hard handoff process, an existing speech path can not be maintained in contrast to the above discussed softer handoff and soft handoff processes. Accordingly, only the new speech path is used to transmit a voice packet.

In the CDMA mobile communication system, a handoff control signal procedure between the mobile station and the base station including a control station is processed using three messages in a mobile station assisting handoff system. First, the mobile station monitors the same frequency pilot signal strength of an adjacent cell to transmit a pilot strength measurement message (PSMM). Second, after analyzing the PSMM and determining whether another speech path is constituted or any one among pre-established speech paths is retrieved, the base station and the control station transmit an extended handoff direction message (EHDM) to the mobile station to instruct the handoff. Third, the mobile station receiving the EHDM takes the action corresponding to the instruction of the base station and the control station and as a result transmits a handoff completion message (HCM). For example, the mobile station can establish or retrieve a new speech path. During the procedure of the handoff control signal, the adjacent base station, which receives the PSMM from the mobile station upon starting the handoff, should have the same frequency as during the initial call.

FIG. 1 is a diagram illustrating a multiple frequency environment of an exemplary CDMA system. The CDMA system includes an A terminal base station 104 that exists in a boundary area of the multiple frequency environment using Fh group frequencies and Fn group frequencies in a subscriber overcrowded area, an adjacent B base station 105 and a C base station 106, which uses a small Fh group frequencies like the terminal base station but in a subscriber non-overcrowded area. A Base Station Controller (BSC) 102 controls the A terminal base station 104 and the adjacent B base station 105. A Base Station Conttroller 103 controls the C base station 106. An Mobile Switching Center (MSC) 100 exchanges communications between the Base Station Controllers 102 and 103 and a location register 101 registers positions of mobile stations such as mobile stations 107 and 108. The Mobile Switching Center 100 can further be coupled to control communications with a public switched telephone network (not shown) or the like.

When the base station uses a different frequency from the adjacent base station in the multiple frequency environment of a CDMA system, the mobile station can not transmit the PSMM for the adjacent base station so the handoff can not be achieved. In other words, the handoff should be made with a frequency of an object cell for the existing call but the frequency for the adjacent base station does not exist in the current cell or the mobile station.

A related art method to solve the above-described problem uses a hardware device that transmits all frequencies used in the multiple frequency environment, including the frequencies used in the base station and the adjacent base station. The hardware device is installed and the PSMM is generated when the mobile station is moved to the object cell. In other words, if the PSMM is generated, the base station and the control station analyze the PSMM and process a CDMA system handoff control signal procedure using the hard handoff method.

When the mobile station is moved to the object cell, the mobile station can measure a pilot signal of the object cell and transmit the PSMM as a handoff process determining message. Therefore, the hard handoff between direct frequencies can be achieved in accordance with the CDMA system handoff control signal procedure. In other words, if the PSMM is analyzed and the signal strength of the object cell is fully satisfied with the hard handoff condition, the CDMA system constitutes a new speech path between the mobile station and the object cell and simultaneously retrieves the speech path of the existing cell.

Even if, however, the related art method is widely used, a plurality of the base stations as shown in FIG. 1 exist, for example, in the peripheral area of the multiple frequency environment. The related art method has a problem in that a large amount of installation cost is required for the hardware device.

A second related art method is disclosed in Korean Patent Application No. 96-7664 (Publication Date Jun. 8, 1996) entitled "Handoff determining method of CDMA cellular system". Korean Application No. 96-7664 (hereafter '7664) discloses a handoff process method in which a separate pilot transmission hardware device is not installed in an adjacent base station. That is, the mobile station does not measure the pilot strength of the object cell. The mobile system compares a cell signal during current call with a newly suggested signal strength comparison parameter value. The mobile system transmits the PSMM to achieve the CDMA system handoff control signal procedure if the compared result exceeds a predetermined level.

In the '7664 method, a new threshold value parameter T_HRDH, which corresponds to any value between values T-ADD and T_DROP, is defined and transmitted to the mobile station. The values T-ADD and T-DROP are handoff pilot threshold values defined and used in a CDMA standard (TIA/EIA IS-95/J-STD-008). At the time, the mobile station does not measure the pilot strength of the object cell and monitors the pilot strength of the existing cell during the call. Here, if the monitored pilot strength value is over the T-HRDH value, the mobile station transmits the PSMM to thereby generate a hard handoff within cells from an existing cell F1 to an object cell F0. Once the call is transmitted to the object cell F0, it generates the soft handoff with the object cell F0.

However, the '7664 method deviates from the CDMA standard between the mobile station and the base station. Accordingly, there is a problem in that it can not be readily applicable because of incompatibility with existing mobile stations.

In a third related art method, Korean Patent Application No. 96-27545 (Publication Date Jul. 22, 1996) entitled "Handoff control method between different cell hierarchies in CDMA cellular system" discloses another handoff process method in which a separate pilot transmission hardware device is not installed in the adjacent base station. That is, the mobile station senses its own frame error rate during call and if the sensed frame error rate is larger than a specific threshold value, processes the handoff from the time point. The mobile station during a call in the existing cell reports the frame error rate and a mean power value to the base station. If the frame error rate is larger than the specific threshold value, processes the hard handoff between the frequencies between the object cell and the existing cell.

However, since the call during a conversation with an arbitrary cell has a good frame error rate in the whole area excepting a boundary area of the terminal base station and the frame error rate is increased without moving to the boundary area if an amount of calls are increased, there is a problem in that if the frame error rate is considered a threshold value to determine the handoff process time point, the handoff time point is too late or is not accurate. The above references are incorporated by reference herein where appropriate for appropriate teachings of additional or alternative details, features and/or technical background.

SUMMARY OF THE INVENTION

An object of the present invention is to provide a communication system and handoff control method that substantially obviates one or more of the problems caused by limitations and disadvantages of the related art.

Another object of the present invention is to provide a method for operating a communication system that assigns a cell to a frequency group based on a distance to a base station from the originator.

Another object of the present invention is to provide a communication system and handoff control method that uses a virtual boundary in the operation of a multiple frequency base station.

A further object of the present invention is to provide a communication system and handoff control method that applies round trip delay.

A still further object of present the invention is to provide a communication system and handoff control method that assigns frequencies when establishing calls and uses a virtual cell boundary based on a round trip delay value between the mobile station and the base station when a handoff process is required between multiple frequencies generated when a mobile station is moved between two base stations having different frequency environments in the operation of base station having a multiple frequency.

To accomplish at least the above objects in a whole or in parts, a method of operating a communication system includes assigning an originating call to one of the first group and a second group of frequencies based on a distance between an originating unit and a first base station.

To further accomplish at least the above objects of the present invention in a whole or in parts, a handoff control method includes forming a virtual cell boundary using a frequency coexisting between a terminal base station on a boundary area of multiple frequency environment and an adjacent base station, pre-determining a call having a large handoff possibilities and a call having a small handoff possibilities in accordance with the virtual cell boundary upon establishment of call in the terminal base station to thereby assign different frequencies to the calls and when the call assigned as a frequency group having the small handoff possibilities is moved to an object base station, tracking that the call approaches the virtual cell during movement to an object base station to determine a handoff time point and thereby controlling a hard handoff processing procedure between frequencies.

To further accomplish the above objects, a communication system includes a first base station that control calls within a first cell using a first frequency group; a terminal base station that controls calls within a second cell that is adjacent the first cell, wherein the terminal base station determines a virtual cell boundary within the second cell, wherein the terminal base station establishes calls within the virtual cell boundary using a second frequency group and calls outside the virtual cell using the first frequency group, and wherein when a call using a frequency in the second frequency group moves to the second base station, the terminal base station controls a hard handoff processing procedure to a frequency in the first frequency group based on the virtual cell.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A preferred embodiment of a handoff control method using a virtual cell boundary in multiple frequency environment according to the present invention will now be described. The preferred embodiment satisfies a code division multiple access standard (TIA/EIA IS-95/J-STD-008), which ensures compatibility with conforming terminals and a handoff signal control procedure according to the preferred embodiment conforms to a CDMA standard procedure. Further, the preferred embodiment of the handoff control method is easily applied to existing systems and reduces installation cost by eliminating a need for a separate hardware device to transmit a pilot signal in a general hard handoff processing manner.

Figure 1:
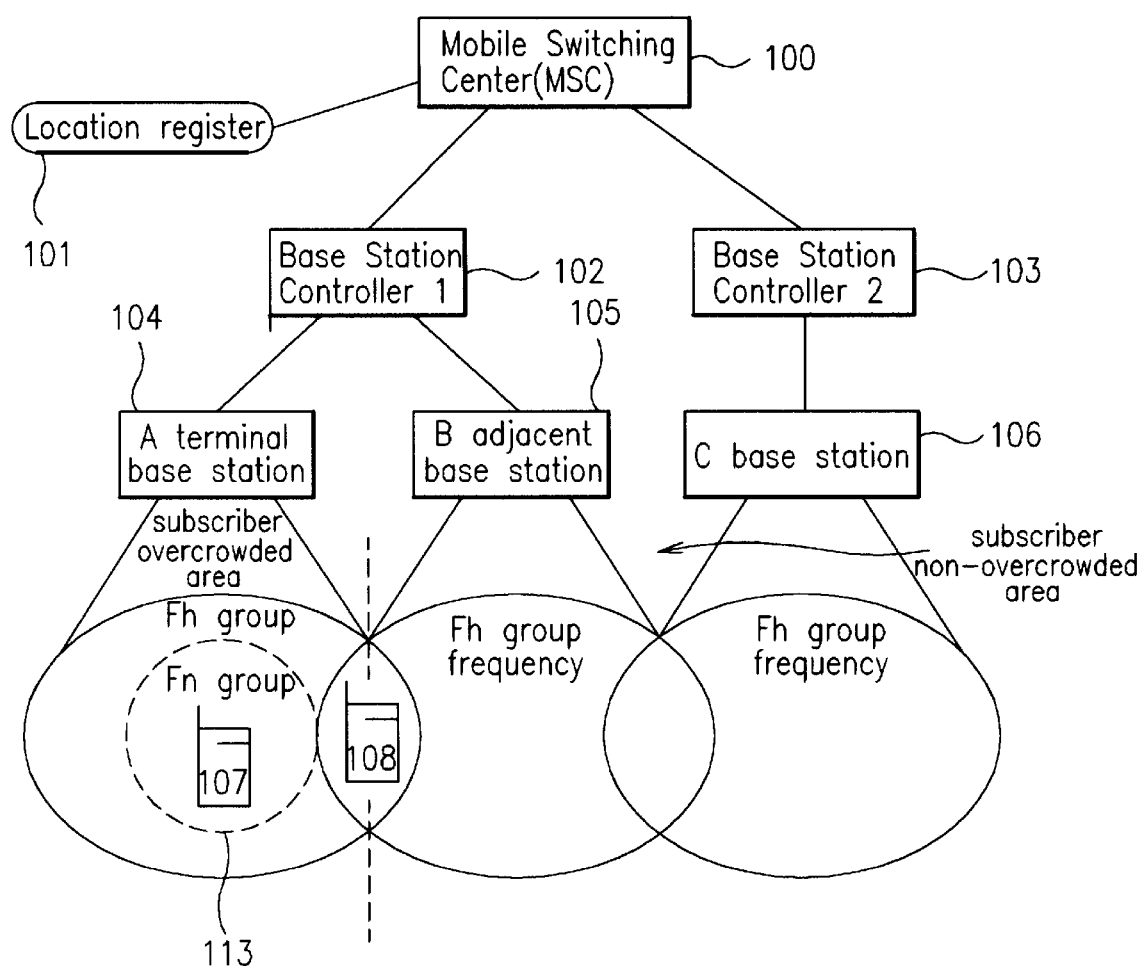
FIG. 1 is a diagram illustrating a multiple frequency environment of a code division multiple access system.

In the handoff control method according to the preferred embodiment, an originating call or an established call is assigned a frequency based on round trip delay of signals to a base station. A virtual cell environment can be built by applying a round trip delay value between the mobile station and the base station in a multiple frequency environment of code division multiple access (CDMA) system as shown in FIG. 1. Based on the virtual cell environment, various processes achieve the handoff control. In general, an exemplary handoff procedure according to the preferred embodiment of the present invention can include (a) forming a virtual cell boundary using a frequency (e.g., the frequency F0 is a frequency in the frequency Fh group) coexisting between an A terminal base station on a boundary area of multiple frequency environment and an adjacent B base station. The adjacent B base station can have a smaller frequency (e.g., set of channels) than that of the terminal base station as shown in FIG. 1. The exemplary handoff procedure can further include (b) pre-determining a call handoff probability based on the virtual cell boundary when establishing calls in a terminal base station to thereby assign different frequencies to the calls, and (c) tracking a cell having small handoff possibilities established in the terminal base station frequency group (e.g., Fn) as the call approaches the virtual cell during movement to an object base station to determine a handoff time point and control a hard handoff processing procedure between the base stations or between frequencies. The call can contain voice data, information such as facsimile or video data and control data.

In step (a), first a call is set by using the frequency F0 that is commonly used in the two base stations and the hard handoff time point generated between the two base stations is determined. For example, the hard handoff is achieved by a frame offset variation, which can be tested without any separate device. Since the time point to be processed by the handoff through the frame offset variation is the same as that of hard handoff through frequency variation, a virtual cell boundary forming procedure according to the preferred embodiment is as follows.

Figure 2:
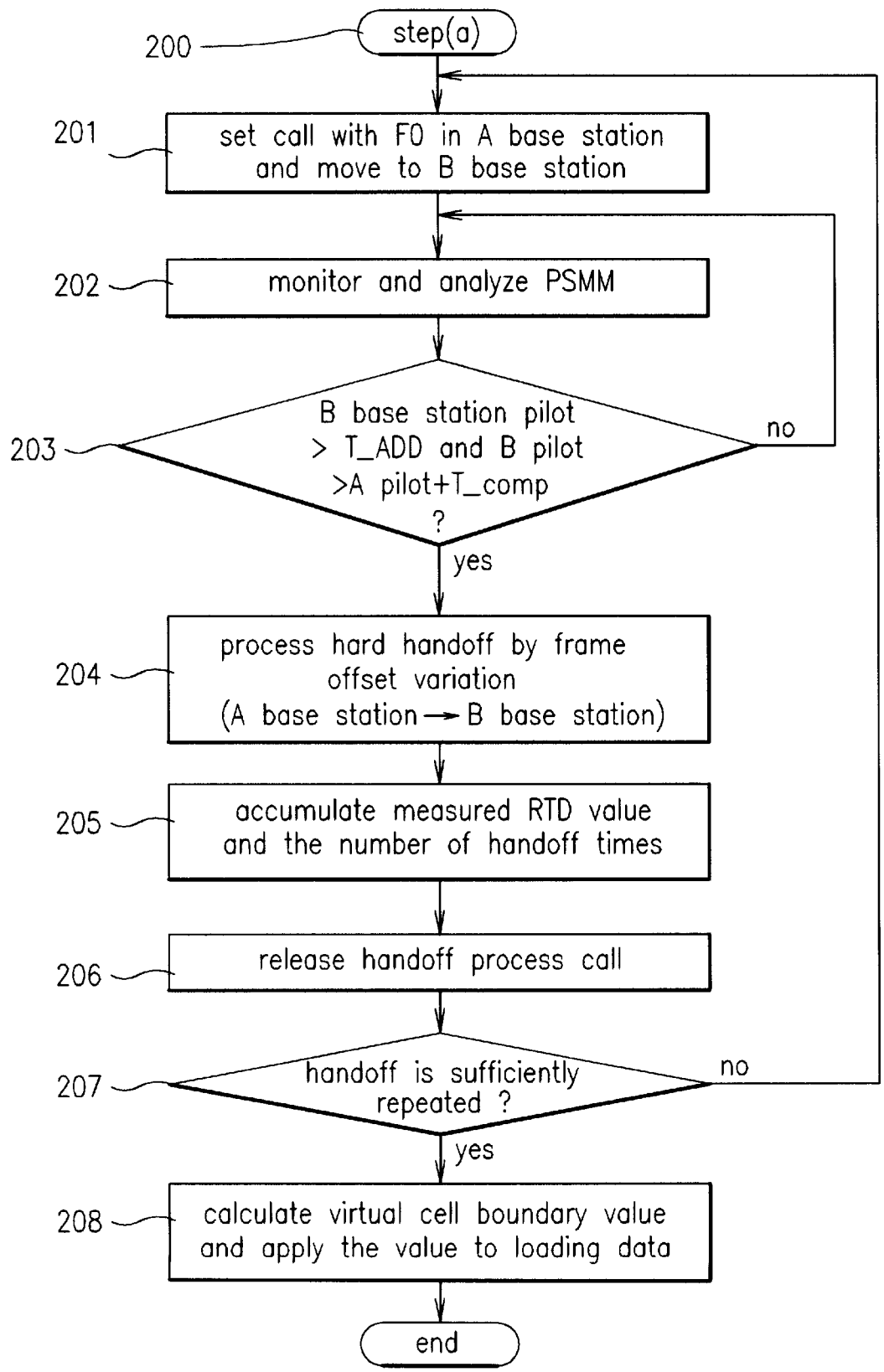
FIG. 2 is a flow chart illustrating a virtual cell boundary forming procedure according to a preferred embodiment of the present invention.

As shown in FIG. 2, the virtual cell forming process starts in step 200 where control continues to step 201. In step 201, a call is set with the common frequency F0 in the A base station and then moves to the B base station. From step 201, control continues to step 202. In step 202, upon movement to the B base station, the PSMM is generated for the B base station and analyzed. From step 202, control continues to step 203. To prevent a ping-pong phenomenon between the two base stations, at step 203, the hard handoff determines whether an object cell strength for the B station is over a serving pilot strength of the A station by a value T_COMP and whether the B base station pilot is over a value T_ADD, which is a condition of the soft handoff. If the determination of step 203 is negative, control returns to step 202. If the determination in step 203 is affirmative, control continues to step 204. In step 204, the hard handoff is achieved by the frame offset variation to the B base station. From step 204, control continues to step 205. If the hard handoff is successfully achieved, at step 205 the control station at the time point of generation of PSMM accumulates a round trip delay (RTD) value of a call during a conversation or the like reported by the A base station and a number of completed handoffs. From step 205, control continues to step 206 where base station A releases the cell. From step 206, control continues to step 207.

To obtain an accurate mean value of the round trip delay value T_RTD, in step 207, a sufficient or statistically representative number of hard handoffs need to be executed. If the determination in step 207 is negative, control returns to step 201. If the determination in step 207 is affirmative, control continues to step 208.

In step 208, a delay value (reserve_chip) that is a necessary time for preparation of the handoff is subtracted from the obtained mean value. A circle 113 shown as a dotted line in FIG. 1 indicates a virtual cell radius to which the measured round trip delay value T_RTD is applied. That is, the interior of the dotted circle represents a point (Fn frequency group) where the handoff is not generated. Outside the circle 113 represents a point (Fh frequency group) where the handoff is likely to be generated.

The virtual cell radius determined according to the preferred embodiment can be used as a frequency assigning boundary area in the step (b) and as a first condition for activation of the handoff in the step (c) as described below. Thus, the virtual call boundary is one representation of the round trip delay time of the transmitted signals, which can be determined by received messages. The round trip delay values are one representation of a base station coverage and characteristics or the actual measured or varying distance to a reporting base station from the originating mobile unit. In step 208, the round trip delay value T_RTD is preferably loaded to a terminal base station and is transmitted to a corresponding base station. From step 208, the process ends.

The round trip value RTD, which is measured by a predetermined period, is a two-way delay value between the mobile station and the base station and is detected by the number in a unit of ⅛ chip in the CDMA system. Since a chip rate in the CDMA system is 1.2288 MHZ, the delay time of one chip is 814 ns. Therefore, the one chip corresponds to two-way length of about 244 m, and the ⅛ chip corresponds to an one-way length of about 15 m. However, the measured round trip delay value contains a part of mobile station delay value. Additionally, the virtual cell radius may be different from a real distance because of a fading effect or the like. Fading effects are encountered, for example, in city environments. However, if the virtual cell radius according to the preferred embodiment is different from the real distance, it does not negatively impact its applicability. In other words, since the virtual cell radius is obtained from the real environment, the value measured in the call (which is applied in the handoff) in which a different frequency is used is the same.

Figure 3:
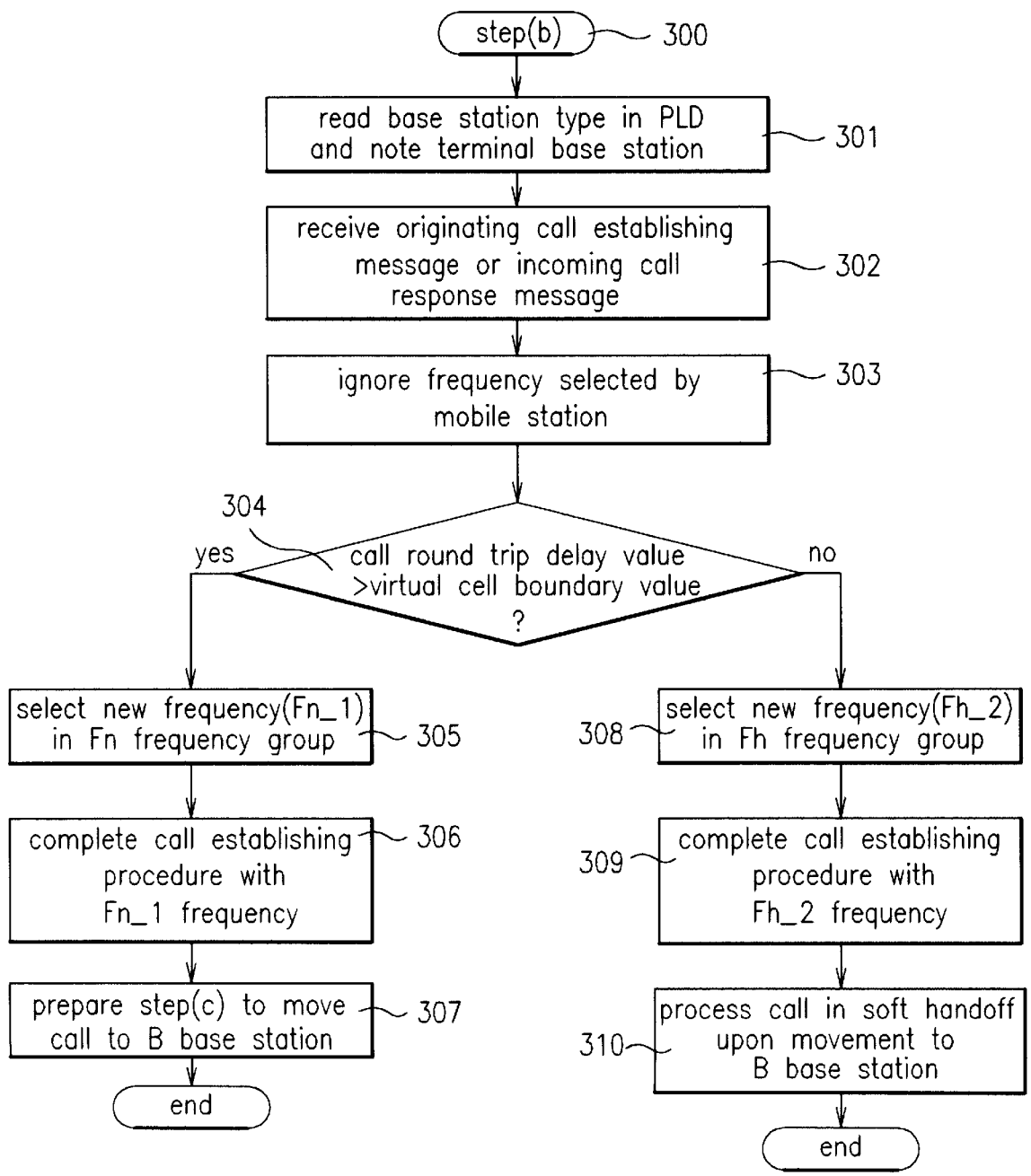
FIG. 3 is a flow chart illustrating a frequency reassigning call processing procedure using the virtual cell boundary according to a preferred embodiment of the present invention.

As shown in FIG. 3, to perform the step (b) according to the preferred embodiment, upon establishment of call, a frequency resource is assigned based on the virtual cell boundary detected in the step (a). As shown in FIG. 3, the frequency resource assignment process (e.g., step (b)) according to the preferred embodiment begins in step 300, where control continues to step 301. In step 301, it should be noted that the base station such as a type of base station (e.g., A base station) is preferably maintained according to the preferred embodiment. This is possible by adding a new base station type (e.g., the terminal base station) to the data indicating the base station type. Thus, in step 301, the base station type is read and the terminal base station is identified. From step 301, control continues to step 302.

In step 302, an originating call establishing message is received at a terminal base station. The originating call establishing message can be received from a reverse direction access channel of the terminal base station or a paging response message is received from a base station call process processor. Further, the frequency resource is then preferably assigned with reference to the corresponding RTD value measured in the access channel. Generally, in the CDMA system, the terminal base station transmits the multiple frequency information (on the number of frequencies being used) with a predetermined period. Then the mobile station, which has a hash function according to its own number, selects the frequency to be used.

However, in step 303 in the preferred embodiment, the frequency selected by the mobile station is ignored. From step 303, control continues to step 304. In step 304, the round trip delay value of the call received from the access channel is compared with the virtual cell boundary value T_RTD. As a result, the frequency is re-assigned by the groups (e.g., Fn and Fh frequency groups) measured in the step (a). In other words, if the result in steps 304 is affirmative because the round trip delay value RTD is contained in the Fn frequency group, control continues to steps 305–307. In steps 305 and 306, the mobile station determines that the point where the handoff is not generated and selects a new frequency Fn_1 among the frequencies that do not exist in the adjacent B base station to establish a corresponding call. From step 306, control continues to step 307. In step 307, the step (c) is performed if necessary to move the call contained in the Fn frequency group to the handoff area, that is, the B base station.

On the other hand, if the result in step 304 is negative because the round trip delay value RTD is contained in the Fh frequency group, control continues to steps 308–310. In steps 308 and 309, the mobile station determines that the point where the handoff is generated and selects a new frequency Fh_2 among the frequencies that exist in the adjacent B base station to establish the corresponding call.

Since the call of the Fh frequency group established by the frequency reassigning process is assigned as the frequency existing in the B base station, in step 310, the call is advantageously processed in the soft handoff method upon generation of the handoff. Therefore, no additional procedure is required for the call of the Fh frequency group. From steps 307 and 310, the process ends.

Figure 4:
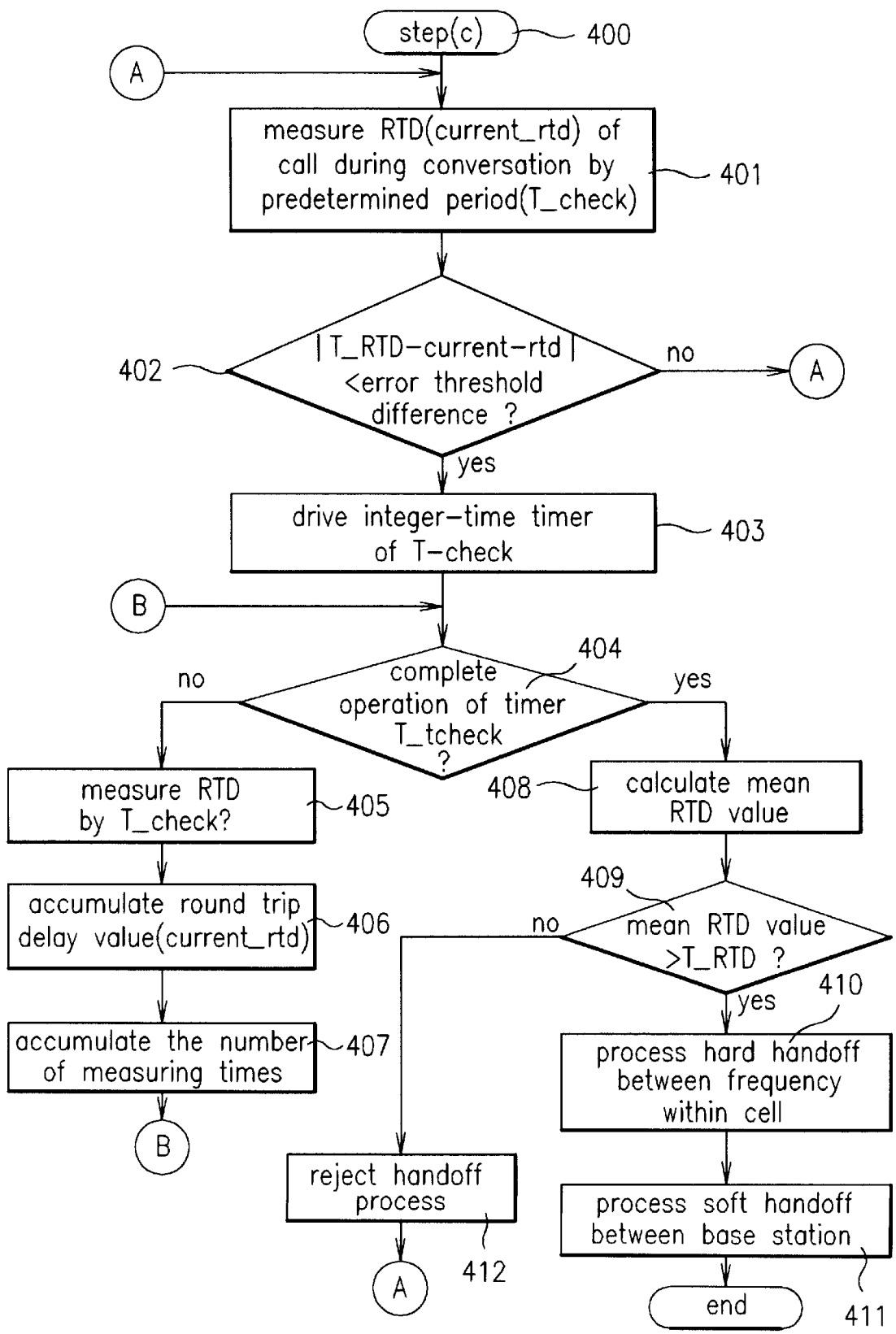
FIG. 4 is a flow chart illustrating a handoff control procedure using the virtual cell boundary according to a preferred embodiment the present invention.

Referring to FIG. 4, after the mobile station acknowledges that the call contained in the Fn group during conversation is moved to the Fh boundary area, the determining procedure (e.g., step (c)) according to the preferred embodiment generates a hard handoff within a cell of the A base station to change the call to the Fh frequency group. The process begins in step 400 where control continues to step 401. In step 401, the base station reports by a predetermined period T_check a current round trip delay value current_rtd between the mobile station and the base station to the control station. From step 401, control continues to step 402.

In step 402, the reported value of current_rtd is compared to a value (e.g., a difference value between them is within an error threshold δ) approximating the virtual cell boundary value T_RTD. If the determination in step 402 is negative control returns to step 401. If the determination in step 402 is affirmative, control continues to step 403. In step 403, an integer-time timer T_tcheck of the predetermined period T_check is driven. From step 403, control continues to 404.

In step 404, it is determined whether the operation of the timer T_tcheck is complete. If the determination in step 404 is negative, control continues to step 405. In step 405, the current round trip delay value current_rtd, which varies during the operation interval of the timer T_tcheck, is measured. From step 405, control continues to step 406 where the current_rtd is accumulated as a total value total_rtd. From step 406, control continues to step 407 where the number of measuring times trial_no is determined. From step 407, control returns to step 404. Thus, steps 404–407 illustrate one exemplary process to determine the data for a mean round trip delay value. As described above, if the determination in step 404 is affirmative because the operation of the timer T_tcheck is completed, control continues from step 404 to step 408.

In step 408, a mean round trip delay value mean_rtd is calculated by using the values total_rtd and trial_no. From step 408, control continues to step 409 where the value mean_rtd is compared to the value T_RTD.

If the determination in step 409 is positive because the mean round trip delay value is over the virtual cell boundary, control continues to step 410. In step 410, because it was determined that the mobile station has actually moved to the Fh frequency group area, the hard handoff within the cell of the A base station is processed in the CDMA standard protocol procedure. Thus, the hard handoff processing within the A base station transitions the call to the Fh frequency group. From step 410, control continues to step 411. In step 411, the soft handoff procedure is made from the A base station to the B base station. Accordingly, the handoff process between the multiple frequencies according to the preferred embodiment of the present invention, the soft handoff procedure, which does not instantaneously cut the operation of a conversation channel is used in step 411. Therefore, the resources of the Fh frequency group should be prepared for the purpose of the soft handoff channel when compared with Fn group. From step 411, the process ends.

However, if the determination in step 409 is negative because the value mean_rtd is under the value T_RTD, the initial determination of the step 402 is considered to be incorrect. Thus, control continues to step 412 since the initial value uses a momentary value caused by the fading effect or the like. In step 412, the handoff process is rejected and control returns to step 401 (i.e., the step (c) is restarted).

In the preferred embodiment, the base station is a one-sector base station, but the present invention is not intended to be limited to this. For example, the present invention can be applied to a three-sector base station. In the description of the present invention, a specific sector is not shown. However, a specific sector can be described as the environment between cells of two base stations.

The three steps applied in the preferred embodiment are preferably processed in the base station and the base station controller. Further, the protocol between the mobile station and the base station directly uses the CDMA standard protocol(TIA/EIA IS-95/J-STD-008) without any correction. Accordingly, the mobile station according to the preferred embodiment does not require any variation and can maintain compatibility with all kinds of terminals. Thus, the handoff control method using the virtual cell boundary according to the preferred embodiment of the present invention is applicable in existing systems. However, a variation of data base, application program and/or processor control routine (e.g., software) can be required.

Further, the mobile station can process the hard handoff with a base station coupled to another mobile communication system. However, the present invention is not intended to be so limited. The present invention is applicable to a digital cellular system or a personal portable communication system or the like using a CDMA mobile communication technique.

Beneficially, communication systems and a handoff control method that uses a virtual cell boundary in multiple frequency environment according to the preferred embodiment does not require an additional installation of an expensive pilot transmitting equipment for processing the handoff inevitably generated in the boundary area between a subscriber overcrowded area and the peripheral area, as the number of subscribers are increased in the CDMA system in the multiple frequency environment. In addition, since a timely and an accurate handoff determination is made in the handoff procedure based on at least one of the assignment of frequency and the virtual cell boundary, a percentage of successful handoffs is increased, even beyond the related art method of installing pilot transmitting equipment.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of operating a communication system comprising:

controlling calls within a second cell controlled by a second base station using a second frequency group; and controlling calls within a first cell with a first base station, wherein the second base station is adjacent to the first base station, wherein the first base station determines a virtual cell boundary within the first cell, wherein the first base station establishes calls within the virtual cell boundary using a first frequency group and calls outside the virtual cell boundary using the second frequency group, and wherein when a call using a frequency in the first frequency group moves to the second base station, the first base station controls a hard handoff procedure to a frequency in the second frequency group based on the virtual cell.

2. The method of claim 1, further comprising assigning a call to one of the first frequency group and the second frequency group based on distance between an originating mobile station and the first base station, wherein the distance is based on a round trip delay period of signals between the mobile station and the first base station.

3. The method of claim 2, wherein the distance is a measured distance.

4. The method of claim 2, wherein the distance varies based on movement of at least one of the mobile station and the first base station.

5. The method of claim 2, wherein the distance varies based on at least one of a signal strength of the first base station and a coverage area of the first base station.

6. The method of claim 1, further comprising forming a virtual cell boundary based on a distance between an originating mobile station and the first base station, wherein the first frequency group has an associated first probability of handoff and the second frequency group has a second associated probability of handoff, and wherein the first probability is less than the second probability.

7. The method of claim 6 further comprising determining a hard handoff time point based on the virtual cell boundary when the call assigned to the first frequency group is moved to the second base station to control the hard handoff processing procedure between the first group and the second group of frequencies.

8. The method of claim 7, wherein the hard handoff processing procedure comprises the hard handoff by the first base station from the first frequency group to the second frequency group and then a soft handoff from the first base station to the second base station using a frequency of the second frequency group.

9. The method of claim 7, wherein the determining step comprises the steps of:

reporting at a predetermined interval a call round trip delay value between the mobile station and the base station to a control station; and driving a timer of the predetermined period if the call round trip delay value approximates the virtual cell boundary value, wherein the driving a timer step includes repeatedly measuring the call round trip delay value during the operation interval of the timer to accumulate a total value and a number of measuring times to determine a mean round trip delay value when the operation interval of the time is complete to process the hard handoff between frequencies.

10. The method of claim 7, wherein when a mean round trip delay value is greater than the virtual cell boundary value, determining that the mobile station moved to a second frequency group area and processing the hard handoff within the first base station, wherein when the mean round trip delay value is less than the virtual cell boundary value, the hard handoff between frequencies is ignored.

11. The method of claim 6, wherein the forming step forms the virtual cell boundary based on hard handoffs of calls in the second frequency group between the first base station and the second base station.

12. The method of claim 6, wherein the forming step comprises the steps of:

selecting a first call in the first base station within the second frequency group and generating a pilot strength measurement message when a corresponding mobile station moves to the second base station;

comparing and analyzing the pilot strength measurement message and determining whether a second base station pilot signal is greater than a first prescribed value and whether a second base station object cell strength is greater than a serving pilot signal strength;

if the comparing step is satisfied, processing a hard handoff by frame offset variation to establish a corresponding call in the second base station;

accumulating a round trip delay value of the corresponding call if the hard handoff is processed and incrementing a counter;

releasing the first call;

obtaining a virtual cell boundary value by repeating the hard handoff process until the counter reaches a prescribed value; and calculating the virtual cell boundary value and the round trip delay value for use as a first base station parameter.

13. The method of claim 12, wherein the comparing step satisfies conditions of a soft handoff.

14. The method of claim 6, further comprising assigning a call to one of the first frequency group and the second frequency second group in the first base station, wherein the assigning step comprises the steps of:

receiving an originating call establishing message for the first base station;

comparing a round trip delay value of the originated call with the virtual cell boundary to assign a frequency resource; and processing a hard handoff between frequencies within cells or soft handoff between base stations in accordance with the compared result of the round trip delay value of call and the virtual cell.

15. The method of claim 14, further comprising:

adding a multiple frequency base station type to a base station data type, wherein the originating call establishment message is received from at least one of a reverse direction access channel of the multiple frequency base station and from a paging response message of a base station call process processor; and selecting a frequency of the first frequency group to establish a corresponding call if the round trip delay value is within the virtual cell boundary.

16. The method of claim 14, wherein the processing step further comprises:

determining a point where the handoff is generated;

selecting a frequency of the second frequency group to establish a corresponding call if the call is outside the virtual cell boundary; and establishing the corresponding call of the second frequency group using a soft handoff.

17. The method of claim 1, wherein the first base station is a terminal, multiple frequency base station and the second base station has a subset of frequencies of the first base station, and wherein the communication system is a CDMA communication system.

18. A communication system comprising:

a first base station that control calls within a first cell using a first frequency group; and a terminal base station that controls calls within a second cell that is adjacent the first cell, wherein the terminal base station determines a virtual cell boundary within the second cell, wherein the terminal base station establishes calls within the virtual cell boundary using a second frequency group and calls outside the virtual cell boundary using the first frequency group, and wherein when a call using a frequency in the second frequency group moves to the first base station, the terminal base station controls a hard handoff processing procedure to a frequency in the first frequency group based on the virtual cell.

19. The communication system of claim 18, further comprising a control station that controls at least the first base station and the terminal base station, wherein said control station can be coupled to an external switching network, wherein the virtual cell is based on a probability of handoff between the second cell and the first cell, and wherein the hard handoff processing procedure comprises a hard handoff within the terminal base station from the second frequency group to the first frequency group and a soft handoff from the terminal base station to the first base station.

20. A method of operating a communication system comprising:

assigning a call to one of the first group and a second group of frequencies based on distance between an originating mobile station and a first base station;

forming a virtual cell boundary based on the distance, wherein the first frequency group has an associated first probability of handoff and the second frequency group has a second associated probability of handoff, and wherein the first probability is less than the second probability; and determining a hard handoff time point based on the virtual cell boundary when the call assigned to the first frequency group is moved to a second adjacent base station to control a hard handoff processing procedure between the first group and the second group of frequencies, wherein the hard handoff processing procedure comprises a hard handoff by the first base station from the first frequency group to the second frequency group and then a soft handoff from the first base station to the second base station using a frequency of the second frequency group.

21. A method of operating a communication system comprising:

assigning a call to one of the first group and a second group of frequencies based on distance between an originating mobile station and a first base station;

forming a virtual cell boundary based on the distance, wherein the first frequency group has an associated first probability of handoff and the second frequency group has a second associated probability of handoff, and wherein the first probability is less than the second probability; and determining a hard handoff time point based on the virtual cell boundary when the call assigned to the first frequency group is moved to a second adjacent base station to control a hard handoff processing procedure between the first group and the second group of frequencies, wherein the determining step comprises the steps of, reporting at a predetermined interval a call round trip delay value between the mobile station and the base station to a control station, and driving a timer of the predetermined period if the call round trip delay value approximates the virtual cell boundary value, wherein the driving a timer step includes repeatedly measuring the call round trip delay value during the operation interval of the timer to accumulate a total value and a number of measuring times to determine a mean round trip delay value when the operation interval of the time is complete to process the hard handoff between frequencies.

22. A method of operating a communication system comprising:

assigning a call to one of the first group and a second group of frequencies based on distance between an originating mobile station and a first base station; and forming a virtual cell boundary based on the distance, wherein the first frequency group has an associated first probability of handoff and the second frequency group has a second associated probability of handoff, and wherein the first probability is less than the second probability, wherein the forming step comprises the steps of, selecting a first call in the first base station within the second frequency group and generating a pilot strength measurement message when a corresponding mobile station moves to the second base station, comparing and analyzing the pilot strength measurement message and determining whether a second base station pilot signal is greater than a first prescribed value and whether a second base station object cell strength is greater than a serving pilot signal strength, if the comparing step is satisfied, processing a hard handoff by frame offset variation to establish a corresponding call in the second base station, accumulating a round trip delay value of the corresponding call if the hard handoff is processed and incrementing a counter, releasing the first call, obtaining a virtual cell boundary value by repeating the hard handoff process until the counter reaches a prescribed value, and calculating the virtual cell boundary value and the round trip delay value for use as a first base station parameter.

23. The method of claim 22, wherein the comparing step satisfies conditions of a soft handoff.

24. A method of operating a communication system comprising:

assigning a call to one of the first group and a second group of frequencies based on distance between an originating mobile station and a first base station; and forming a virtual cell boundary based on the distance, wherein the first frequency group has an associated first probability of handoff and the second frequency group has a second associated probability of handoff, wherein the first probability is less than the second probability, and wherein the assigning step comprises the steps of, receiving an originating call establishing message for the first base station, comparing a round trip delay value of the originated call with the virtual cell boundary to assign a frequency resource, and processing a hard handoff between frequencies within cells or soft handoff between base stations in accordance with the compared result of the round trip delay value of call and the virtual cell.

25. The method of claim 24, further comprising:

adding a multiple frequency base station type to a base station data type, wherein the originating call establishment message is received from at least one of a reverse direction access channel of the multiple frequency base station and from a paging response message of a base station call process processor; and selecting a frequency of the first frequency group to establish a corresponding call if the round trip delay value is within the virtual cell boundary.

26. The method of claim 24, wherein the processing step further comprises:

determining a point where the handoff is generated;

selecting a frequency of the second frequency group to establish a corresponding call if the call is outside the virtual cell boundary; and establishing the corresponding call of the second frequency group using a soft handoff.

* * * * *